(12) United States Patent
Shimizu

(10) Patent No.: US 10,780,920 B2
(45) Date of Patent: Sep. 22, 2020

(54) DEVIATION AVOIDANCE APPARATUS

(71) Applicant: DENSO CORPORATION, Kariya, Aichi-pref. (JP)

(72) Inventor: Takahiro Shimizu, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 259 days.

(21) Appl. No.: 15/740,538

(22) PCT Filed: Jun. 23, 2016

(86) PCT No.: PCT/JP2016/068618
§ 371 (c)(1),
(2) Date: Dec. 28, 2017

(87) PCT Pub. No.: WO2017/002697
PCT Pub. Date: Jan. 5, 2017

(65) Prior Publication Data
US 2018/0170430 A1 Jun. 21, 2018

(30) Foreign Application Priority Data

Jun. 30, 2015 (JP) ................................ 2015-131315

(51) Int. Cl.
*B62D 15/02* (2006.01)
*B60W 50/14* (2020.01)
(Continued)

(52) U.S. Cl.
CPC .......... *B62D 15/025* (2013.01); *B60W 30/10* (2013.01); *B60W 30/12* (2013.01); *B60W 50/14* (2013.01);
(Continued)

(58) Field of Classification Search
CPC ... B62D 15/025; B62D 15/021; B60W 50/14; B60W 30/12; B60W 30/10;
(Continued)

(56) References Cited

U.S. PATENT DOCUMENTS

| 6,487,501 B1* | 11/2002 | Jeon ..................... B62D 15/025 180/167 |
| 7,391,304 B2* | 6/2008 | Kataoka ................ B60W 30/12 180/204 |

(Continued)

FOREIGN PATENT DOCUMENTS

| JP | 2006-182127 | 7/2006 |
| JP | 4702398 B2 | 6/2011 |

(Continued)

*Primary Examiner* — Peter D Nolan
(74) *Attorney, Agent, or Firm* — Maschoff Brennan

(57) ABSTRACT

A deviation avoidance apparatus of an embodiment includes a boundary detection section that detects boundaries of a travelling path on which an own vehicle travels; a deviation prediction section that predicts that the own vehicle will deviate from the travelling path based on a travelling condition of the own vehicle that travels in the travelling path defined by the boundaries detected by the boundary detection section; a deviation avoidance section that commands, when the deviation prediction section predicts that the own vehicle will deviate from the travelling path, a steering control unit to have a steering actuator drive a steering mechanism that changes a traveling direction of the own vehicle such that the own vehicle avoids deviating from the travelling path; and a notification section that notifies vehicle passengers, via a notification unit, when the steering actuator applies driving force to the steering mechanism such that the own vehicle avoids deviating from the travelling path, that deviation avoidance of the own vehicle is ongoing.

4 Claims, 5 Drawing Sheets

(51) Int. Cl.
 *B60W 30/10* (2006.01)
 *B60W 30/12* (2020.01)
(52) U.S. Cl.
 CPC ..... *B62D 15/021* (2013.01); *B60W 2050/146* (2013.01); *B60W 2510/202* (2013.01); *B60W 2540/18* (2013.01)
(58) Field of Classification Search
 CPC ....... B60W 2540/18; B60W 2050/146; B60W 2510/202
 See application file for complete search history.

(56) References Cited

U.S. PATENT DOCUMENTS

| | | | | |
|---|---|---|---|---|
| 7,692,534 | B2 * | 4/2010 | Kataoka | B62D 15/029 180/204 |
| 8,666,599 | B2 * | 3/2014 | Otuka | G08G 1/167 701/41 |
| 9,180,908 | B2 * | 11/2015 | Van Dan Elzen | B60W 30/16 |
| 9,403,480 | B2 * | 8/2016 | Faeuster | B60Q 9/008 |
| 9,406,232 | B2 * | 8/2016 | Kataoka | G08G 1/167 |
| 9,610,976 | B2 * | 4/2017 | Terazawa | B62D 15/025 |
| 9,758,163 | B2 * | 9/2017 | Van Dan Elzen | B60W 50/16 |
| 9,834,213 | B2 * | 12/2017 | Okuda | B60W 10/18 |
| 9,862,415 | B2 * | 1/2018 | Okuda | B60W 50/10 |
| 10,427,679 | B2 * | 10/2019 | Van Dan Elzen | B60W 10/20 |
| 2002/0188404 | A1 * | 12/2002 | Jeon | B62D 15/025 701/301 |
| 2005/0270145 | A1 * | 12/2005 | Kataoka | B60W 30/12 340/435 |
| 2005/0273261 | A1 * | 12/2005 | Niwa | B60W 50/14 701/301 |
| 2008/0117033 | A1 * | 5/2008 | Kataoka | B60W 30/12 340/435 |
| 2010/0026519 | A1 * | 2/2010 | Hsiao | B60W 30/12 340/905 |
| 2010/0138115 | A1 * | 6/2010 | Kageyama | B60R 21/0134 701/46 |
| 2010/0191421 | A1 * | 7/2010 | Nilsson | B62D 15/025 701/41 |
| 2012/0226392 | A1 * | 9/2012 | Kataoka | G08G 1/167 701/1 |
| 2012/0296522 | A1 * | 11/2012 | Otuka | G08G 1/167 701/41 |
| 2013/0231830 | A1 * | 9/2013 | Van Dan Elzen | B62D 6/00 701/42 |
| 2014/0025257 | A1 * | 1/2014 | Komoguchi | B60Q 5/005 701/36 |
| 2014/0253309 | A1 * | 9/2014 | Faeuster | B62D 15/025 340/438 |
| 2016/0059856 | A1 * | 3/2016 | Van Dan Elzen | B60W 30/12 701/42 |
| 2016/0075334 | A1 * | 3/2016 | Terazawa | B62D 15/025 701/41 |
| 2016/0129938 | A1 * | 5/2016 | Okuda | B60W 50/10 701/41 |
| 2016/0137201 | A1 * | 5/2016 | Okuda | B60W 10/18 701/41 |
| 2017/0369058 | A1 * | 12/2017 | Van Dan Elzen | B60W 10/04 |
| 2018/0009437 | A1 * | 1/2018 | Ooba | B60W 30/12 |

FOREIGN PATENT DOCUMENTS

| | | |
|---|---|---|
| JP | 2014-118025 | 6/2014 |
| JP | 2017-013526 | 1/2017 |

* cited by examiner

DEVIATION AVOIDANCE APPARATUS

TECHNICAL FIELD

The present invention relates to a technique for avoiding deviation of an own vehicle from a traveling path.

BACKGROUND ART

Techniques for controlling, in a case where the own vehicle traveling on the travelling path is predicted to deviate therefrom, a travelling condition of the own vehicle such that the own vehicle avoids deviating from the travelling path are known (refer, for example, to Patent Literature 1).

According to the technique disclosed in Patent Literature 1, when the own vehicle is predicted to deviate from the travelling path, an attempt to have the own vehicle avoid deviating from the travelling path by applying steering torque from an electric motor of an electric power-steering unit to steering rods is made.

According to the technique disclosed in Patent Literature 1, when a waveform of the steering torque that is applied from the electric motor to a steering mechanism including the steering rods is calculated such that the own vehicle avoids deviating from the travelling path, a notification that deviation avoidance is ongoing is provided by warning via a warning buzzer and indication on a meter.

CITATION LIST

Patent Literature

[Patent Literature 1] Japanese Patent No. 4702398

SUMMARY OF THE INVENTION

Technical Problem

However, according to the technology disclosed in Patent Literature 1, before the electric motor outputs the steering torque in accordance with the calculated waveform of the steering torque, the ongoing deviation avoidance may be notified by the warning via the warning buzzer and the indication on the meter.

In this case, the ongoing deviation avoidance is notified at a timing before the steering torque is applied from the electric motor to the steering mechanism. In addition, the electric motor and the steering mechanism each has structural play and frictional force that delay actual actuation. Thus, a time when the steering torque of the electric motor is applied to the steering mechanism and a steering angle is changed after application of electrical power to the electric motor starts is delayed.

Thus, when the ongoing deviation avoidance is notified at the timing before the steering torque is applied from the electric motor to the steering mechanism, a significant difference occurs between an actual traveling condition of the own vehicle and a deviation avoidance condition to be notified. As a result, vehicle passengers feel a significant sense of discomfort.

Solution to Problem

An embodiment provides a deviation avoidance apparatus that reduces the difference between a travelling condition of an own vehicle and a deviation avoidance condition to be notified as much as possible.

A deviation avoidance apparatus of an embodiment includes a boundary detection section that detects boundaries of a travelling path on which an own vehicle travels; a deviation prediction section that predicts that the own vehicle will deviate from the travelling path based on a travelling condition of the own vehicle that travels in the travelling path defined by the boundaries detected by the boundary detection section; a deviation avoidance section that commands, when the deviation prediction section predicts that the own vehicle will deviate from the travelling path, a steering control unit to have a steering actuator drive a steering mechanism that changes a traveling direction of the own vehicle such that the own vehicle avoids deviating from the travelling path; and a notification section that notifies vehicle passengers, via a notification unit, when the steering actuator applies driving force to the steering mechanism such that the own vehicle avoids deviating from the travelling path, that deviation avoidance of the own vehicle is ongoing.

DESCRIPTION OF EMBODIMENTS

Hereinafter, embodiments of the present invention are described with reference to the drawings.

1. First Embodiment

[1-1. Configuration]

Figure 1:
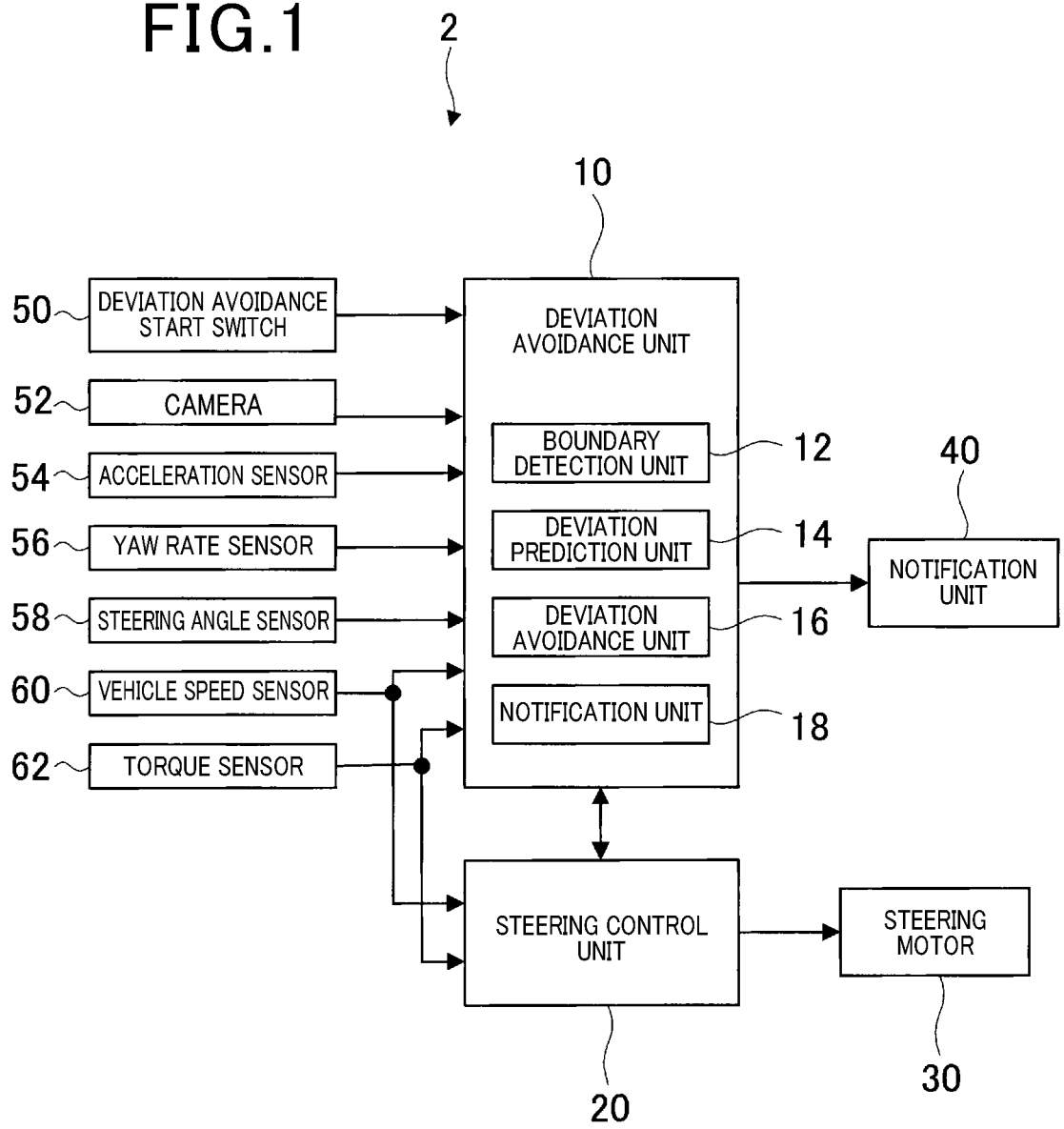
FIG. 1 is a block diagram showing a deviation avoidance apparatus according to a first embodiment.

A deviation avoidance system 2 shown in FIG. 1 includes a deviation avoidance unit 10, a steering control unit 20, a steering motor 30, a notification unit 40, a deviation avoidance start switch 50, a camera 52, an acceleration sensor 54, a yaw-rate sensor 56, a steering angle sensor 58, a vehicle speed sensor 60, and a torque sensor 62. This system is installed in a vehicle.

The deviation avoidance unit 10 is a computer including a CPU, a RAM, and a ROM. The deviation avoidance unit 10 performs, in accordance with a program stored in the ROM, a deviation avoidance process described later. In the following, the vehicle having the deviation avoidance unit 10 installed therein is referred to as an own vehicle.

The deviation avoidance unit 10 functionally includes a boundary detection section 12, a deviation prediction section 14, a deviation avoidance section 16, and a notification section 18. Functions of these sections of the deviation avoidance unit 10 are described below.

The travel control unit 20 acquires, from the torque sensor 62, steering torque produced by the operation of a steering wheel (hereinafter, also simply referred to as "wheel") by the driver, and acquires a vehicle speed of an own vehicle from the vehicle speed sensor 60. Furthermore, the travel control unit 20 calculates, based on the steering torque and the vehicle speed, assist torque from the steering motor 30 that assists the steering operation by the driver. In addition, the travel control unit 20 controls the steering motor 30 with the amount of electrical power applied in accordance with the result of the calculation. Thereby, the amount of assistance for the force exerted by the driver to turn the wheel is controlled.

Further, in a case of having the own vehicle avoid deviating from the travelling path in which the own vehicle is traveling, the travel control unit 20 controls the amount of electrical power applied to the steering motor 30 in response to a command issued from the deviation avoidance unit 10. Thereby, the travelling condition of the own vehicle is controlled. The travelling condition of the own vehicle includes vehicle speeds in a longitudinal direction and a lateral direction of the own vehicle, a lateral position of the own vehicle on the travelling path, and accelerations in the longitudinal direction and the lateral direction of the own vehicle. The steering motor 30 corresponds to a steering actuator that drives a steering mechanism that changes the travelling direction of the own vehicle.

The notification unit 40 notifies, in a form of at least one of display, sound, voice, and vibration, that deviation avoidance of the own vehicle is ongoing. A display unit of an instrument panel, a display, a buzzer, a speaker, a vibration generating unit, or the like is used as the notification unit 40. Examples of the vibration generating unit, which is configured to vibrate the wheel, include a vibrator installed in the wheel and the steering motor 30.

Figure 2:
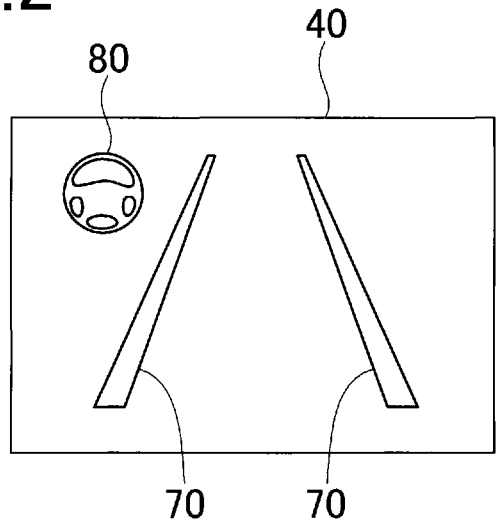
FIG. 2 is an explanatory drawing illustrating how ongoing deviation avoidance is displayed by a notification unit.

FIG. 2 illustrates an example in which white line markers 70 that are displayed when white lines of the travelling path are detected during the deviation avoidance, and a wheel mark 80 that notifies of the ongoing deviation avoidance are displayed on the instrument panel that serves as the notification unit 40. Instead of the instrument panel, there may be used a display of a navigation unit (not shown), or a display dedicated to the notification of the ongoing deviation avoidance.

Further, the ongoing deviation avoidance may be notified by a beep of the buzzer, voice from the speaker, or the vibration of the vibration generating unit.

The deviation avoidance start switch 50 is installed, for example, in the instrument panel. When the deviation avoidance start switch 50 is turned on, the deviation avoidance process to be performed by the deviation avoidance unit 10 is started.

The camera 52 is configured to capture images ahead of the own vehicle. The deviation avoidance unit 10 analyzes data of images acquired by the camera 52. The acceleration sensor 54 detects the accelerations in the longitudinal direction and the lateral direction of the own vehicle. The yaw rate sensor 56 detects a turn angular velocity of the own vehicle.

The steering angle sensor 58 detects a steering angle of the wheel. The vehicle speed sensor 60 detects a current vehicle speed of the own vehicle. The torque sensor 62 detects the torque at the time when the driver operates the wheel.

[1-2. Process]

Figure 3:
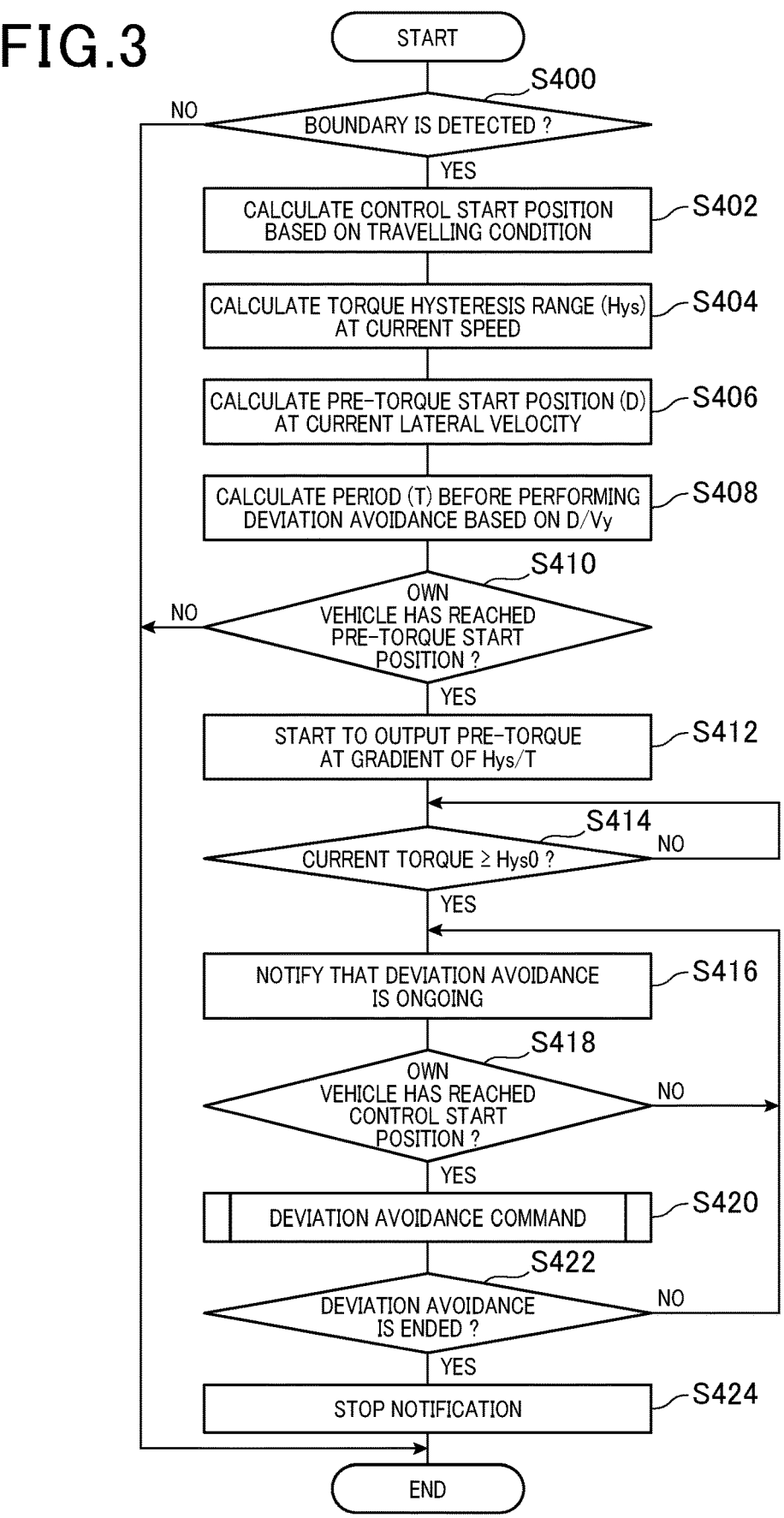
FIG. 3 is a flowchart of a deviation avoidance process according to the first embodiment.

The deviation avoidance process performed by the deviation avoidance unit 10 will be described. When the deviation avoidance start switch 50 is turned on, the deviation avoidance process shown in the flowchart of FIG. 3 is performed at predetermined time intervals.

Figure 4:
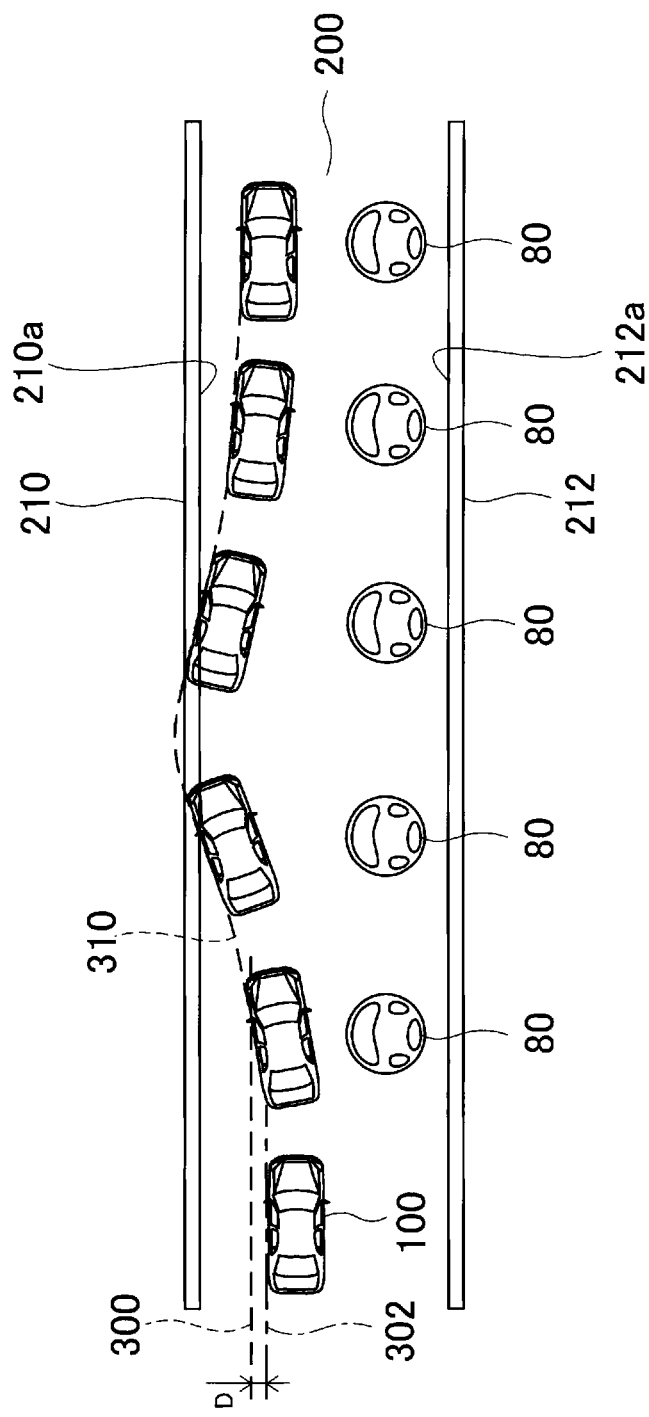
FIG. 4 is a schematic drawing illustrating deviation avoidance travel by an own vehicle.

In S400, as illustrated in FIG. 4, the boundary detection section 12 analyzes the data of the images acquired by the camera 52, and determines whether or not boundaries of a travelling path 200 in which the own vehicle 100 travels can be detected. The boundaries of the travelling path 200 define both edges in the width direction of the travelling path 200.

In FIG. 4, inner edges 210*a* and 212*a* of left and right white lines 210 and 212 of the travelling path 200 are defined as the boundaries of the travelling path 200. The boundaries are not limited to the inner edges 210*a* and 212*a*, and may be preset arbitrary positions on the white lines 210 and 212, such as outer edges of the white lines 210 and 212. In a case where the white lines do not exist on the travelling path, for example, boundaries between a paved surface and unpaved surfaces, which are detected by analyzing the image data items, are defined as the boundaries of the travelling path.

In S400, the boundary detection section 12 not only detects the boundaries of the travelling path 200, but also detects the width of the travelling path 200. In addition, the boundary detection section 12 detects coordinates of the boundaries of the travelling path 200 within a range of the images to be acquired by the camera 52. Then, the boundary detection section 12 calculates a curvature of the travelling path 200 based on the coordinates of the boundaries. The boundary detection section 12 may acquire the curvature of the travelling path 200 based on map information of the navigation unit (not shown).

Further, based on the image data, the boundary detection section 12 also detects, as a reference point on the travelling path 200, for example, the lateral position of the own vehicle 100 with respect to the boundaries or the center line of the travelling path 200.

In a case where the boundary detection section 12 cannot detect the boundaries of the travelling path 200 (S400: No), the boundary detection section 12 ends the present process. For example, in a case where the boundaries between the paved surface and the unpaved surfaces cannot be detected on a travelling path where the white lines are broken or the white lines do not exist, the boundary detection section 12 determines that the boundaries of the travelling path cannot be detected.

In a case where the boundaries of the travelling path 200 can be detected (S400: Yes), the deviation prediction section 14 calculates a control start position 300 illustrated in FIG. 4 (S402). The control start position 300 refers to a position at which, based on a current travelling condition of the own vehicle 100, the own vehicle 100 in this travelling condition is predicted to deviate from the travelling path 200 several seconds later.

The deviation prediction section 14 determines the control start position 300 from the map, specifically, based on a distance (D) from one of the boundaries on the deviation side toward the inside of the travelling path 200 by using parameters of the travelling condition of the own vehicle 100, such as a current lateral velocity of the own vehicle 100, the curvature of the travelling path 200, and the width of the travelling path 200.

Next, under a state in which the current vehicle speed of the own vehicle 100 is maintained, the deviation prediction section 14 increases driving torque, which is driving force for driving the steering mechanism by the steering motor 30, and calculates, as a hysteresis range (Hys) (S404), boundary driving force, that is, a value of the driving torque at the time when the steering angle actually starts to be changed. The hysteresis range becomes smaller as the vehicle speed is higher.

In S406, the deviation prediction section 14 calculates, based on the current lateral velocity of the own vehicle 100, a pre-torque start position at which the steering motor 30 applies pre-torque, which is driving torque equal to or lower than the hysteresis range, to the steering mechanism. The pre-torque start position 302 is set as the distance (D) from the control start position 300 to the inside of the travelling path 200. As the lateral velocity of the own vehicle 100 is higher, the pre-torque start position 302 is spaced further apart from the control start position 300.

The pre-torque start position 302 refers to a position at which the steering motor 30 starts to apply, to the steering mechanism, the pre-torque within a range in which the steering angle is not changed even when the steering motor 30 applies the driving torque to the steering mechanism by the time when the own vehicle 100 reaches the control start position 300.

Note that, in order that the steering motor 30 does not generate the pre-torque also when the lateral position of the own vehicle 100 is even slightly shifted with respect to the center of the travelling path 200, a lower limit value (restriction value) is set for the distance (D).

In S408, a period (T) from the time point when the own vehicle 100 reaches the pre-torque start position 302 to the time point when the deviation avoidance is performed after the driving torque applied from the steering motor 30 to the steering mechanism becomes equal to or larger than the hysteresis range (Hys) and the steering angle is changed is calculated based on the distance (D) and the lateral velocity (Vy) of the own vehicle 100, that is, based on the following expression (1).

$$T = D/Vy \tag{1}$$

In S410, the deviation avoidance section 16 determines whether or not the own vehicle 100 has reached the pre-torque start position 302. Note that, when the outer rim of a front wheel on the deviation side of the own vehicle 100 reaches the pre-torque start position 302, the deviation avoidance section 16 determines that the own vehicle 100 has reached the pre-torque start position 302.

Figure 5:
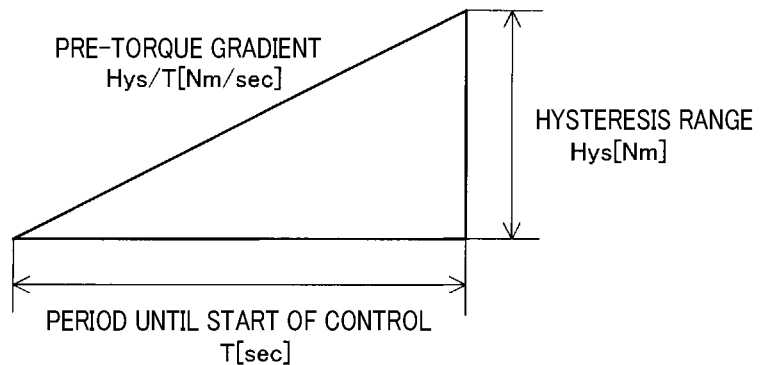
FIG. 5 is an explanatory drawing indicating a hysteresis range of pre-torque.

When the own vehicle 100 reaches the pre-torque start position 302 (S410: Yes), the deviation avoidance section 16 commands the steering control unit 20 to control the steering motor 30 so as to output the pre-torque at a gradient of Hys/T as shown in FIG. 5 (S412).

In a case where the driving torque is applied from the steering motor 30 to the steering mechanism and where the driving torque is increased to be equal to or larger than notification start torque (Hys0) lower than the hysteresis range (Hys) (S414: Yes), the notification section 18 notifies, in the form of the at least one of display, sound, and voice via the notification unit 40, passengers in the own vehicle 100 that the deviation avoidance is ongoing (S416).

The driving torque applied from the steering motor 30 to the steering mechanism is calculated, for example, from drive current with which the steering control unit 20 controls the steering motor 30 by applying electrical power thereto.

As illustrated in FIG. 4, even when the own vehicle 100 reaches the pre-torque start position 302 and the steering motor 30 outputs the pre-torque, the wheel mark 80 is not displayed immediately thereafter. As illustrated in FIG. 4, the wheel mark 80 is displayed after the pre-torque increases to be equal to or higher than the notification start torque (Hys0) and the own vehicle 100 approaches the control start position 302.

When the own vehicle 100 reaches the control start position 300 (S418: Yes), the deviation avoidance section 16 commands the steering control unit 20 to perform, instead of having the steering motor 30 apply the pre-torque to the steering mechanism, deviation avoidance control (S420) such that the own vehicle 100 travels while avoiding deviation along a target line 310 illustrated in FIG. 4. Note that, when the outer rim of the front wheel on the deviation side of the own vehicle 100 reaches the control start position 300, the deviation avoidance section 16 determines that the own vehicle 100 has reached the control start position 300.

Figure 6:
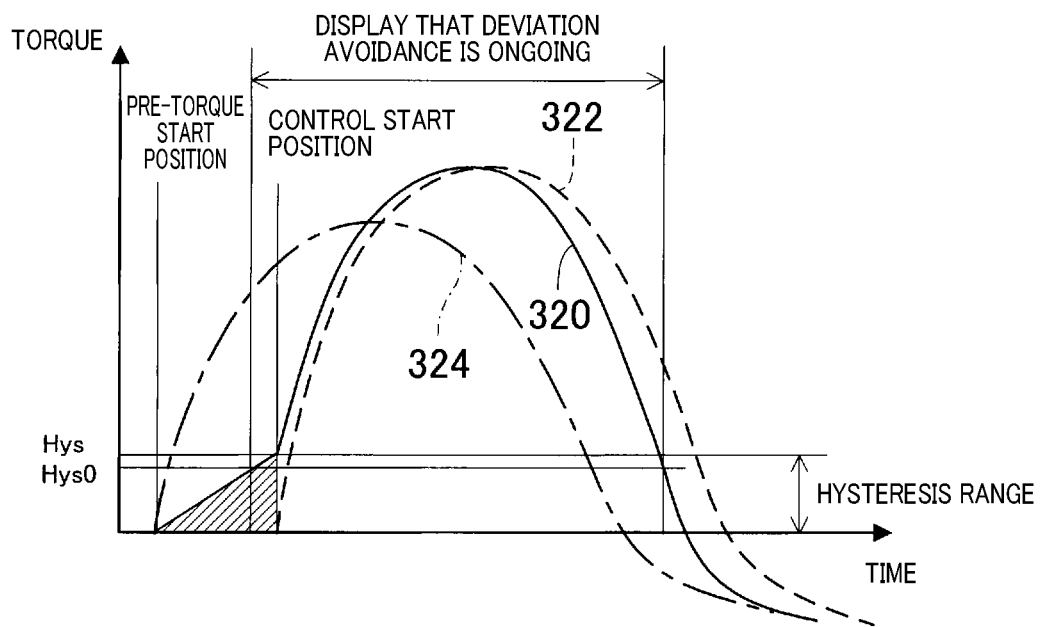
FIG. 6 is a characteristic diagram showing changes in driving torque by the deviation avoidance process.

When the steering control unit 20 performs the deviation avoidance control in S420, as indicated by the solid line in FIG. 6, subsequent to the pre-torque, driving torque 320 is applied from the steering motor 30 to the steering mechanism.

When the steering motor 30 outputs the pre-torque before the own vehicle 100 reaches the control start position 300, the driving torque for actually changing the steering angle is promptly applied from the steering motor 30 to the steering mechanism at the time when the own vehicle 100 reaches the control start position 300.

When the own vehicle 100 reaches the end point of the target line 310, the deviation avoidance control is ended (S422: Yes). Then, the notification section 18 stops the notification of the ongoing deviation avoidance via the notification unit 40 (S424).

[1-3. Effects]

According to the first embodiment described above, the following advantages can be obtained.

(1) As denoted by the reference symbol 322 in FIG. 6, under a state in which the pre-torque has not been applied to the steering mechanism, when driving torque is applied to the steering mechanism by starting application of electrical power to the steering motor 30 after the own vehicle 100 reaches the control start position 300, the time when the driving torque increases to change the steering angle is delayed.

Further, under the state in which the own vehicle 100 has reached the pre-torque start position 302, when driving torque for having the own vehicle 100 avoid deviating from the travelling path 200 is applied instead of the pre-torque to the steering mechanism as denoted by the reference numeral 324 in FIG. 6, it is at least possible to easily avoid the deviation from the travelling path 200.

In this case, the steering angle is changed as soon as the own vehicle 100 reaches the pre-torque start position 302 on the inside of the travelling path 200 with respect to the control start position 300. Thus, even when the own vehicle 100 has not yet started to travel in a manner of deviating from the travelling path 200, the steering angle is changed. As a result, the driver feels a sense of discomfort.

In contrast, according to the first embodiment, when the own vehicle 100 reaches the pre-torque start position 302, the steering motor 30 outputs the pre-torque. Even when the pre-torque is applied to the steering mechanism, the steering angle is not changed. Then, the pre-torque increases, and the own vehicle 100 reaches the control start position 300. Next, the driving torque equal to or more than the hysteresis range (Hys) is applied to the steering mechanism to change the steering angle. Thereby, the travelling direction of the own vehicle 100 is changed. In this way, the own vehicle 100 can start to deviate from the travelling path 200 at optimum timing.

(2) When the pre-torque applied to the steering mechanism becomes equal to or more than the notification start torque (Hys0) that is less than the hysteresis range (Hys), the ongoing deviation avoidance is notified. Thus, the time interval from the notification of the ongoing deviation avoidance to the actual change in the steering angle is shorter than that in a case where the ongoing deviation avoidance is notified at the same time that the steering motor 30 outputs the pre-torque.

Thereby, the difference between the travelling condition of the own vehicle 100 and the deviation avoidance condition to be notified can be reduced. As a result, the sense of discomfort to the passengers in the own vehicle 100 can be alleviated.

Further, even when the own vehicle 100 reaches the pre-torque start position 302, the ongoing deviation avoidance is not notified until the pre-torque becomes equal to or more than the notification start torque (Hys0). Thus, even when the position of the own vehicle 100 fluctuates between the pre-torque start position 302 and the inside with respect thereto, the ongoing deviation avoidance is not notified. Thereby, the frequency of the notification of the ongoing deviation avoidance can be reduced.

2. Second Embodiment

[2-1. Configuration]

The configuration of a deviation avoidance system according to the second embodiment is substantially the same as the configuration of the deviation avoidance system 2 according to the first embodiment. Thus, the description thereof is omitted.

[2-2. Process]

Figure 7:
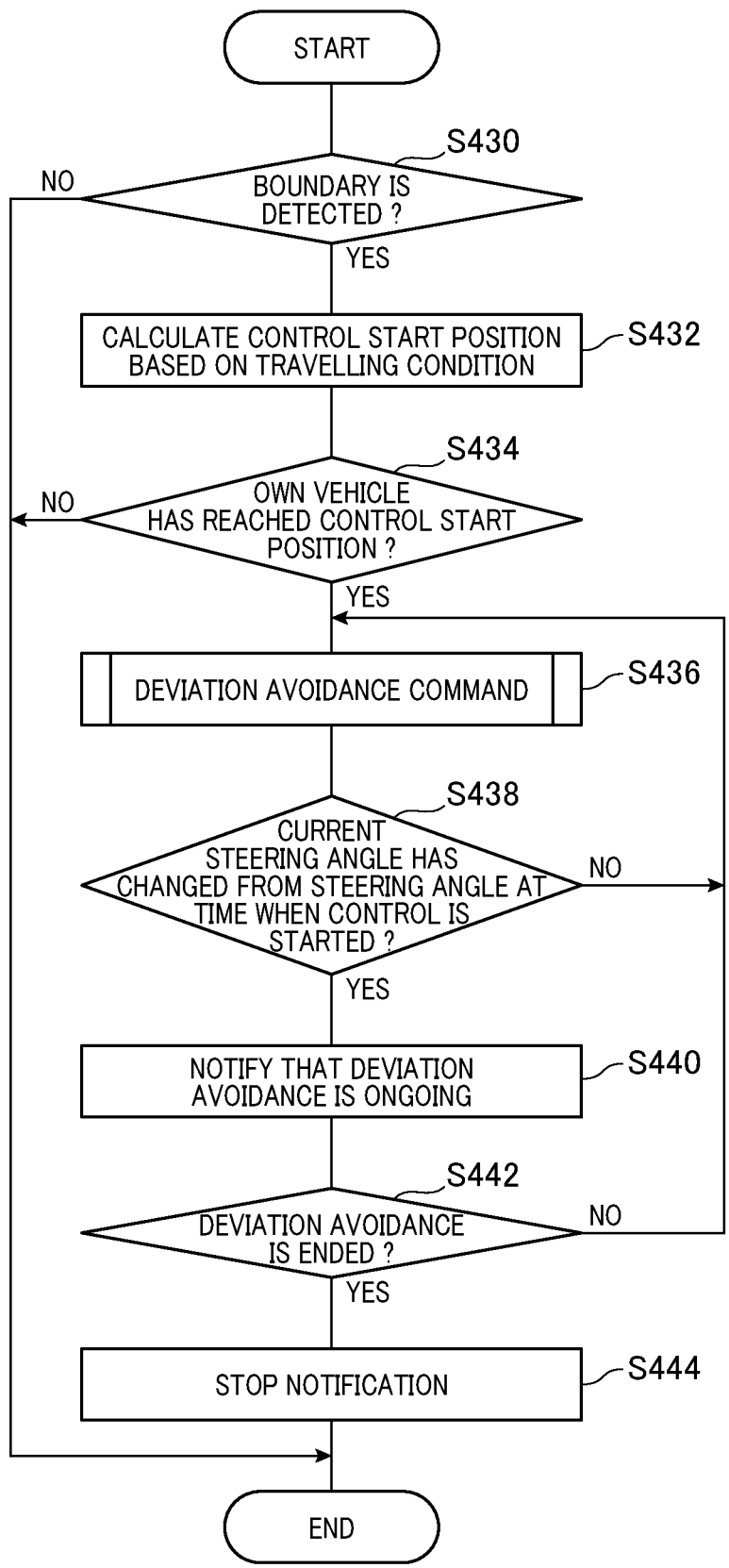
FIG. 7 is a flowchart of a deviation avoidance process according to a second embodiment.

The deviation avoidance process performed by the deviation avoidance unit 10 according to the second embodiment will be described. When the deviation avoidance start switch 50 is turned on, the deviation avoidance process shown in the flowchart of FIG. 7 is performed by the deviation avoidance unit 10 at predetermined time intervals.

In the case where the boundaries of the travelling path 200 in which the own vehicle 100 travels can be detected (S430: Yes), the deviation prediction section 14 calculates the control start position 300 (S432). When the own vehicle 100 reaches the control start position 300 (S434: Yes), the deviation avoidance section 16 commands the steering control unit 20 to start the deviation avoidance control (S436).

When the steering control unit 20 is commanded to start the deviation avoidance control, the driving torque from the steering motor 30 is applied to the steering mechanism. Thereby, the steering angle detected by the steering-angle sensor 58 is changed from the steering angle at the time when the deviation avoidance control is started (S438: Yes). In response, the notification section 18 notifies, in the form of at least one of display, sound, voice, and vibration via the notification unit 40, the passengers in the own vehicle 100 that the deviation avoidance is ongoing (S440).

When the own vehicle 100 reaches the end point of the target line 310, the deviation avoidance control is ended (S442: Yes). Then, the notification section 18 stops the notification of the ongoing deviation avoidance via the notification unit 40 (S444).

[2-3. Effects]

According to the second embodiment described above, the deviation avoidance is notified when the deviation avoidance control is started to actually change the steering angle. Thus, the difference between the travelling condition of the own vehicle 100 and the deviation avoidance condition to be notified can be reduced as much as possible.

3. Other Embodiments (1) In the first embodiment, the ongoing deviation avoidance is notified when the driving torque is equal to or larger than the notification start torque (Hys0) smaller than the hysteresis range (Hys). In contrast, the ongoing deviation avoidance may be notified when the driving torque is equal to or larger than the hysteresis range.

(2) The function of one component in the above-described embodiments may be distributed to a plurality of components, or the functions of the plurality of components may be integrated into that of one component. Further, at least some of the configurations of the to above-described embodiments may be replaced with known configurations having similar functions. In addition, some of the configurations of the above-described embodiments may be omitted as long as problems can be solved. Note that, the embodiments of the present invention correspond to various aspects encompassed within the technical idea specified only by the wording of the claims.

(3) The present invention can be realized not only as the above-described deviation avoidance unit 10, but also in various forms such as the deviation avoidance system 2 including the deviation avoidance unit 10 as a component, a deviation avoidance program for allowing a computer to function as the deviation avoidance unit 10, a recording medium storing this deviation avoidance program, and a deviation avoidance method.

The deviation avoidance unit (10) according to the embodiment includes the boundary detection section (12, S400, S430), the deviation prediction section (14, S402 to S408, S434), the deviation avoidance section (16, S410 to S414, S418, S420, S436), and the notification section (18, S416, S424, 438, S444). The boundary detection section detects the boundaries of the travelling path in which the own vehicle travels. Based on a travelling condition of the own vehicle that travels in the travelling path defined by the boundaries detected by the boundary detection section, the deviation prediction section predicts that the own vehicle will deviate from the travelling path. When the deviation prediction section predicts that the own vehicle will deviate from the travelling path, the deviation avoidance section commands the steering control unit to have the steering actuator drive the steering mechanism that changes the traveling direction of the own vehicle. Thereby, the own vehicle avoids deviating from the travelling path.

When the steering actuator applies the driving force to the steering mechanism such that the own vehicle avoids deviating from the travelling path, the notification section notifies the vehicle passengers, via the notification unit, that the own vehicle is avoiding deviation from the travelling path.

According to the configuration, the ongoing deviation avoidance is notified under the state in which the driving force is applied from the steering actuator to the steering mechanism. Thus, a period from the notification of the ongoing deviation avoidance to the change in the steering angle by the driving force applied from the steering mechanism can be reduced as much as possible. Thereby, the difference between the travelling condition of the own vehicle and the deviation avoidance condition to be notified can be reduced as much as possible. As a result, the sense of discomfort to the passengers in the own vehicle can be alleviated as much as possible.

REFERENCE SIGNS LIST

2: Deviation avoidance system
10: Deviation avoidance unit
12: Boundary detection unit
14: Deviation prediction unit
16: Deviation avoidance unit 18: Notification unit
30: Steering motor (steering actuator)
40: Notification unit
52: Camera
100: Own vehicle
200: Travelling path
210a, 212a: Inner edge (boundary)
300: Control start position
302: Pre-torque start position

The invention claimed is:

1. A deviation avoidance apparatus comprising:
a boundary detection section that detects boundaries of a travelling path on which an own vehicle travels;
a deviation prediction section that predicts that the own vehicle will deviate from the travelling path based on a travelling condition of the own vehicle that travels in the travelling path defined by the boundaries detected by the boundary detection section;
a deviation avoidance section that commands, when the deviation prediction section predicts that the own vehicle will deviate from the travelling path, a steering control unit to have a steering actuator drive a steering mechanism that changes a traveling direction of the own vehicle such that the own vehicle avoids deviating from the travelling path; and
a notification section that notifies vehicle passengers, via a notification unit, that deviation avoidance of the own vehicle is ongoing,
wherein the deviation avoidance section commands the steering control unit to have the steering actuator start applying first driving force to the steering mechanism before the steering actuator applies second driving force to the steering mechanism so as to change a steering angle such that the own vehicle avoids deviating from the travelling path, and thereafter the notification section starts notifying the vehicle passengers, via the notification unit, that deviation avoidance of the own vehicle is ongoing, before the steering actuator applies the second driving force to the steering mechanism.

2. The deviation avoidance apparatus according to claim 1, wherein
the deviation avoidance section commands in advance the steering control unit to have the steering actuator gradually increase the first driving force to be applied therefrom to the steering mechanism before the steering actuator applies the second driving force to the steering mechanism so as to change the steering angle such that the own vehicle avoids deviating from the travelling path, and in that,
when the first driving force is equal to or larger a boundary driving force at a time when the steering angle is changed by application of the first driving force to the steering mechanism, the notification section notifies the vehicle passengers, via the notification unit, that the deviation avoidance of the own vehicle is ongoing.

3. The deviation avoidance apparatus according to claim 1, wherein when the steering angle is changed by application of the first driving force from the steering actuator to the steering mechanism such that the own vehicle avoids deviating from the travelling path, the notification section notifies the vehicle passengers, via the notification unit, that the deviation avoidance of the own vehicle is ongoing.

4. The deviation avoidance apparatus according to claim 1, wherein the notification unit notifies, in a form of at least one of display, sound, voice, and vibration, that the deviation avoidance of the own vehicle is ongoing.

* * * * *